United States Patent
Liu et al.

(10) Patent No.: US 10,536,583 B2
(45) Date of Patent: Jan. 14, 2020

(54) METHOD AND APPARATUS OF SECURE CHARGING FOR DEVICE-TO-DEVICE SERVICE

(71) Applicant: Nokia Technologies Oy, Espoo (FI)

(72) Inventors: Yang Liu, Beijing (CN); Dajiang Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 1 day.

(21) Appl. No.: 14/904,231

(22) PCT Filed: Jul. 23, 2013

(86) PCT No.: PCT/CN2013/079922
§ 371 (c)(1),
(2) Date: Jan. 11, 2016

(87) PCT Pub. No.: WO2015/010258
PCT Pub. Date: Jan. 29, 2015

(65) Prior Publication Data
US 2016/0150091 A1  May 26, 2016

(51) Int. Cl.
*H04M 15/00* (2006.01)
*H04W 4/24* (2018.01)
(Continued)

(52) U.S. Cl.
CPC .......... *H04M 15/31* (2013.01); *G06Q 20/322* (2013.01); *H04L 43/065* (2013.01)

(58) Field of Classification Search
CPC ..................................................... H04M 15/31
See application file for complete search history.

(56) References Cited

U.S. PATENT DOCUMENTS

| 6,070,076 A | 5/2000 | Valentine |
| 2006/0217107 A1 | 9/2006 | Maes |

(Continued)

FOREIGN PATENT DOCUMENTS

| CN | 102369645 A | 3/2012 |
| EP | 2547039 A1 | 1/2013 |

(Continued)

OTHER PUBLICATIONS

International Search Report and Written Opinion received for corresponding Patent Cooperation Treaty Application No. PCT/CN2013/079922, dated Apr. 30, 2014, 11 pages.

(Continued)

*Primary Examiner* — Gary Lafontant
(74) *Attorney, Agent, or Firm* — Mintz Levin Cohn Ferris Glovsky and Popeo, P.C.

(57) ABSTRACT

A method of secure charging for a device-to-device service may comprise: recording charging information of a device-to-device service between a first user equipment and a second user equipment, wherein the charging information is associated at least with the first user equipment; generating a first report comprising the charging information, wherein the first report is protected by a security key of the first user equipment; and sending the first report to a network node by the first user equipment, wherein the first report is used for charging for the device-to-device service together with a second report generated at the second user equipment, and wherein the second report comprises charging information associated at least with the device-to-device service of the second user equipment and is protected by a security key of the second user equipment.

9 Claims, 4 Drawing Sheets

(51) Int. Cl.
    *G06Q 20/32* (2012.01)
    *H04L 12/26* (2006.01)

(56) References Cited

U.S. PATENT DOCUMENTS

| | | |
|---|---|---|
| 2007/0021096 A1 | 1/2007 | Arslan |
| 2010/0009675 A1 | 1/2010 | Wijting et al. |
| 2010/0190469 A1 | 7/2010 | Vanderveen et al. |
| 2010/0285834 A1* | 11/2010 | Hutchison, IV ........ H04L 67/16 455/550.1 |
| 2012/0210006 A1 | 8/2012 | Vihtari |
| 2013/0013926 A1 | 1/2013 | Hakola et al. |
| 2013/0148526 A1 | 6/2013 | Hwang et al. |
| 2014/0075509 A1* | 3/2014 | Holtmanns ......... H04L 63/0869 726/3 |
| 2015/0133083 A1* | 5/2015 | Van Phan ............. H04L 63/068 455/411 |
| 2015/0350459 A1* | 12/2015 | Isobe .................... H04M 15/80 455/406 |

FOREIGN PATENT DOCUMENTS

| | | |
|---|---|---|
| EP | 2827624 A1 | 1/2015 |
| WO | 2006/016332 A1 | 2/2006 |
| WO | WO 2006-016332 A1 * | 2/2006 |
| WO | 2010/102668 A1 | 9/2010 |
| WO | 2011/085810 A1 | 7/2011 |
| WO | 2011/147462 A1 | 12/2011 |
| WO | 2013/052163 A1 | 4/2013 |

OTHER PUBLICATIONS

Extended European Search Report received for corresponding European Patent Application No. 13889875.4, dated Apr. 6, 2017, 9 pages.

\* cited by examiner

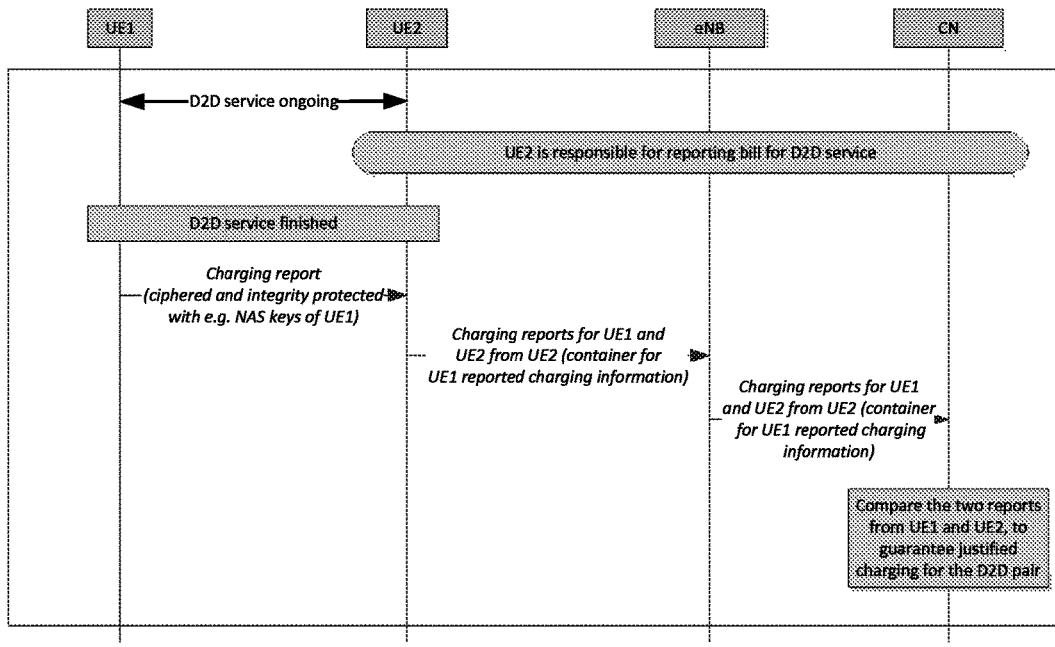
Fig.4
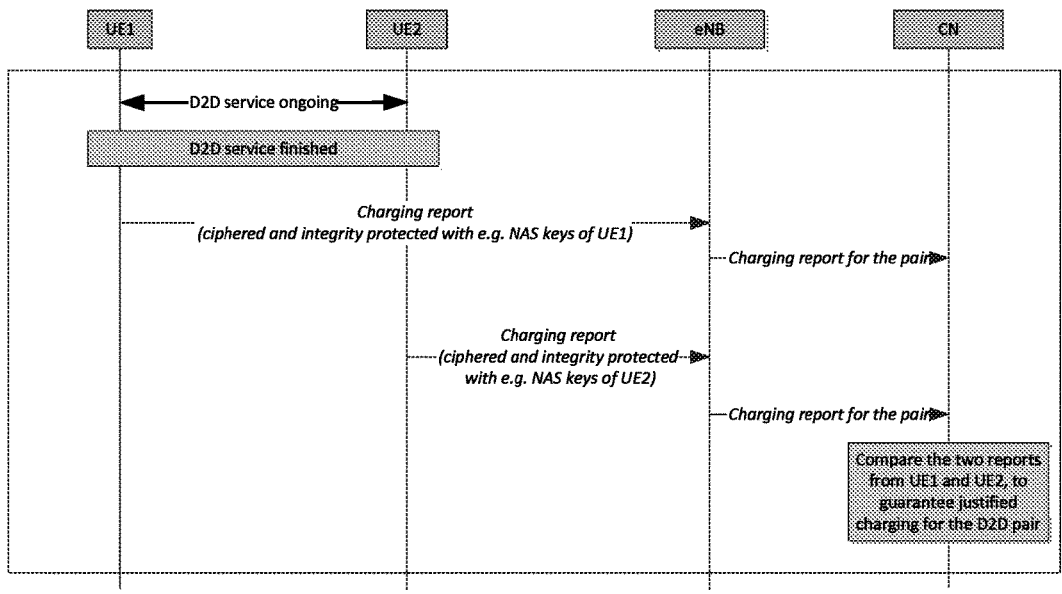

METHOD AND APPARATUS OF SECURE CHARGING FOR DEVICE-TO-DEVICE SERVICE

RELATED APPLICATION

This application was originally filed as Patent Cooperation Treaty Application No. PCT/CN2013/079922 filed Jul. 23, 2013.

FIELD OF THE INVENTION

The present invention generally relates to communication networks. More specifically, the invention relates to a method and apparatus of secure charging for a Device-to-Device (D2D) service.

BACKGROUND

The modern communications era has brought about a tremendous expansion of communication networks. Wireless and mobile networking technologies have addressed related consumer demands, while providing more flexibility and immediacy of information transfer. The development of communication technologies has contributed to an insatiable desire for new functionality. One area of interest is the development of services and technologies of supporting for network-controlled D2D communications. D2D related topics have been widely discussed in 3GPP (3rd Generation Partnership Project) and also got great interests from different network operators. One major concern from a network operator is how to benefit from D2D services. Furthermore, the network operator also needs to guarantee that the charging for the related D2D users would proceed in a promised way. Thus, it is desirable to design a mechanism to avoid cheating on charging for D2D services to promise the operator's benefit accordingly.

SUMMARY

The present description introduces a solution of secure charging for a D2D service. With the proposed solution, the reliability of charging information regarding a D2D service can be enhanced from a view point of a Core Network (CN) and operators. Moreover, the proposed solution can prevent the cheating of charging reports for User Equipments (UEs) engaged in the D2D service.

According to a first aspect of the present invention, there is provided a method comprising: recording charging information of a D2D service between a first UE and a second UE, wherein the charging information is associated at least with the first UE; generating a first report comprising the charging information, wherein the first report is protected by a security key of the first UE; and sending the first report to a network node by the first UE, wherein the first report is used for charging for the D2D service together with a second report generated at the second UE, and wherein the second report comprises charging information associated at least with the D2D service of the second UE and is protected by a security key of the second UE.

According to a second aspect of the present invention, there is provided an apparatus comprising: at least one processor; and at least one memory comprising computer program code, the at least one memory and the computer program code configured to, with the at least one processor, cause the apparatus at least to: record charging information of a D2D service between the apparatus and another apparatus, wherein the charging information is associated at least with the apparatus; generate a first report comprising the charging information, wherein the first report is protected by a security key of the apparatus; and send the first report to a network node by the apparatus, wherein the first report is used for charging for the D2D service together with a second report generated at the another apparatus, and wherein the second report comprises charging information associated at least with the D2D service of the another apparatus and is protected by a security key of the another apparatus.

According to a third aspect of the present invention, there is provided a computer program product comprising a computer-readable medium bearing computer program code embodied therein for use with a computer, the computer program code comprising: code for recording charging information of a D2D service between a first UE and a second UE, wherein the charging information is associated at least with the first UE; code for generating a first report comprising the charging information, wherein the first report is protected by a security key of the first UE; and code for sending the first report to a network node by the first UE, wherein the first report is used for charging for the D2D service together with a second report generated at the second UE, and wherein the second report comprises charging information associated at least with the D2D service of the second UE and is protected by a security key of the second UE.

According to a fourth aspect of the present invention, there is provided an apparatus comprising: recording means for recording charging information of a D2D service between the apparatus and another apparatus, wherein the charging information is associated at least with the apparatus; generating means for generating a first report comprising the charging information, wherein the first report is protected by a security key of the apparatus; and sending means for sending the first report to a network node by the apparatus, wherein the first report is used for charging for the D2D service together with a second report generated at the another apparatus, and wherein the second report comprises charging information associated at least with the D2D service of the another apparatus and is protected by a security key of the another apparatus.

According to exemplary embodiments, the network node may comprise a core network entity. In an exemplary embodiment, the first report and the second report may be associated with a same report identifier. For example, the report identifier may be generated based at least in part on respective identifiers of the first UE and the second UE. In another exemplary embodiment, the first UE is connected to a core network in which the core network entity is, and the first report is sent to the core network entity by the first UE together with the second report received from the second UE. The second report may be ciphered for the first UE. For example, the security key of the second UE may comprise a security key shared between the second UE and the core network entity.

According to exemplary embodiments, the network node may comprise the second UE connected to a core network in which there is a core network entity. In an exemplary embodiment, the security key of the first UE may comprise a security key shared between the first UE and the core network entity. In another exemplary embodiment, the first report may be ciphered for the second UE and forwarded to the core network entity from the second UE together with the second report.

According to a fifth aspect of the present invention, there is provided a method comprising: receiving, at a core network entity, a first report generated at a first UE and a second report generated at a second UE, wherein a D2D service is supported between the first UE and second UE, the first report comprises charging information associated at least with the D2D service of the first UE, and the second report comprises charging information associated at least with the D2D service of the second UE; and forwarding the first report and the second report from the core network entity to a charging node for charging for the D2D service.

According to a sixth aspect of the present invention, there is provided an apparatus comprising: at least one processor; and at least one memory comprising computer program code, the at least one memory and the computer program code configured to, with the at least one processor, cause the apparatus at least to: receive a first report generated at a first UE and a second report generated at a second UE, wherein a D2D service is supported between the first UE and the second UE, the first report comprises charging information associated at least with the D2D service of the first UE, and the second report comprises charging information associated at least with the D2D service of the second UE; and forward the first report and the second report from the apparatus to a charging node for charging for the D2D service.

According to a seventh aspect of the present invention, there is provided a computer program product comprising a computer-readable medium bearing computer program code embodied therein for use with a computer, the computer program code comprising: code for receiving, at a core network entity, a first report generated at a first UE and a second report generated at a second UE, wherein a D2D service is supported between the first UE and the second UE, the first report comprises charging information associated at least with the D2D service of the first UE, and the second report comprises charging information associated at least with the D2D service of the second UE; and code for forwarding the first report and the second report from the core network entity to a charging node for charging for the D2D service.

According to an eighth aspect of the present invention, there is provided an apparatus comprising: receiving means for receiving a first report generated at a first UE and a second report generated at a second UE, wherein a D2D service is supported between the first UE and the second UE, the first report comprises charging information associated at least with the D2D service of the first UE, and the second report comprises charging information associated at least with the D2D service of the second UE; and forwarding means for forwarding the first report and the second report from the apparatus to a charging node for charging for the D2D service.

According to exemplary embodiments, the first report protected by a security key of the first UE may be received from the first UE, and the second report protected by a security key of the second UE may be received from the second UE. In an exemplary embodiment, the first report and the second report may be associated with a same report identifier. For example, the report identifier may be generated based at least in part on respective identifiers of the first UE and the second UE. In another exemplary embodiment, the first report and the second report may be forwarded to the charging node from the core network entity, when operations of decipherment and integrity check on the first report and the second report are performed at the core network entity successfully.

According to exemplary embodiments, the first report protected by a security key of the first UE may be received, together with the second report protected by a security key of the second UE, from the second UE connected to a core network in which the core network entity is. In an exemplary embodiment, the first report may be ciphered for the second UE. For example, the security key of the first UE may comprise a security key shared between the first UE and the core network entity. In another exemplary embodiment, the first report and the second report may be forwarded to the charging node from the core network entity, when an operation of decipherment and integrity check on the first report is performed at the core network entity successfully.

According to exemplary embodiments, the first report and the second report may be forwarded to the charging node from the core network entity, when the first report and the second report are aligned with each other.

According to a ninth aspect of the present invention, there is provided a method comprising: receiving from a core network entity a first report generated at a first UE and a second report generated at a second UE, wherein a D2D service is supported between the first UE and the second UE, the first report comprises charging information associated at least with the D2D service of the first UE, and the second report comprises charging information associated at least with the D2D service of the second UE; and charging for the D2D service based at least in part on the first report and the second report.

According to a tenth aspect of the present invention, there is provided an apparatus comprising: at least one processor; and at least one memory comprising computer program code, the at least one memory and the computer program code configured to, with the at least one processor, cause the apparatus at least to: receive from a core network entity a first report generated at a first UE and a second report generated at a second UE, wherein a D2D service is supported between the first UE and the second UE, the first report comprises charging information associated at least with the D2D service of the first UE, and the second report comprises charging information associated at least with the D2D service of the second UE; and charge for the D2D service based at least in part on the first report and the second report.

According to an eleventh aspect of the present invention, there is provided a computer program product comprising a computer-readable medium bearing computer program code embodied therein for use with a computer, the computer program code comprising: code for receiving from a core network entity a first report generated at a first UE and a second report generated at a second UE, wherein a D2D service is supported between the first UE and the second UE, the first report comprises charging information associated at least with the D2D service of the first UE, and the second report comprises charging information associated at least with the D2D service of the second UE; and code for charging for the D2D service based at least in part on the first report and the second report.

According to a twelfth aspect of the present invention, there is provided an apparatus comprising: receiving means for receiving from a core network entity a first report generated at a first UE and a second report generated at a second UE, wherein a D2D service is supported between the first UE and the second UE, the first report comprises charging information associated at least with the D2D service of the first UE, and the second report comprises charging information associated at least with the D2D service of the second UE; and charging means for charging for the D2D service based at least in part on the first report and the second report.

According to exemplary embodiments, the first UE and the second UE may be charged respectively for the D2D service, when the first report and the second report are aligned with each other. In an exemplary embodiment, the first report and the second report may be associated with a same report identifier.

In exemplary embodiments of the present invention, the provided methods, apparatus, and computer program products can ensure the security of D2D charging information reported by a pair of UEs involved in a D2D service during a reporting procedure, and also can promise the charging information regarding the D2D service would not be modified illegally.

BRIEF DESCRIPTION OF THE DRAWINGS

The invention itself, the preferable mode of use and further objectives are best understood by reference to the following detailed description of the embodiments when read in conjunction with the accompanying drawings, in which:

FIG. 4 exemplarily illustrates a procedure of secured charging reporting via one UE in accordance with an embodiment of the present invention;

FIG. 5 exemplarily illustrates a procedure of secured charging reporting via a pair of D2D UEs separately in accordance with an embodiment of the present invention.

DETAILED DESCRIPTION OF THE INVENTION

Figure 1:
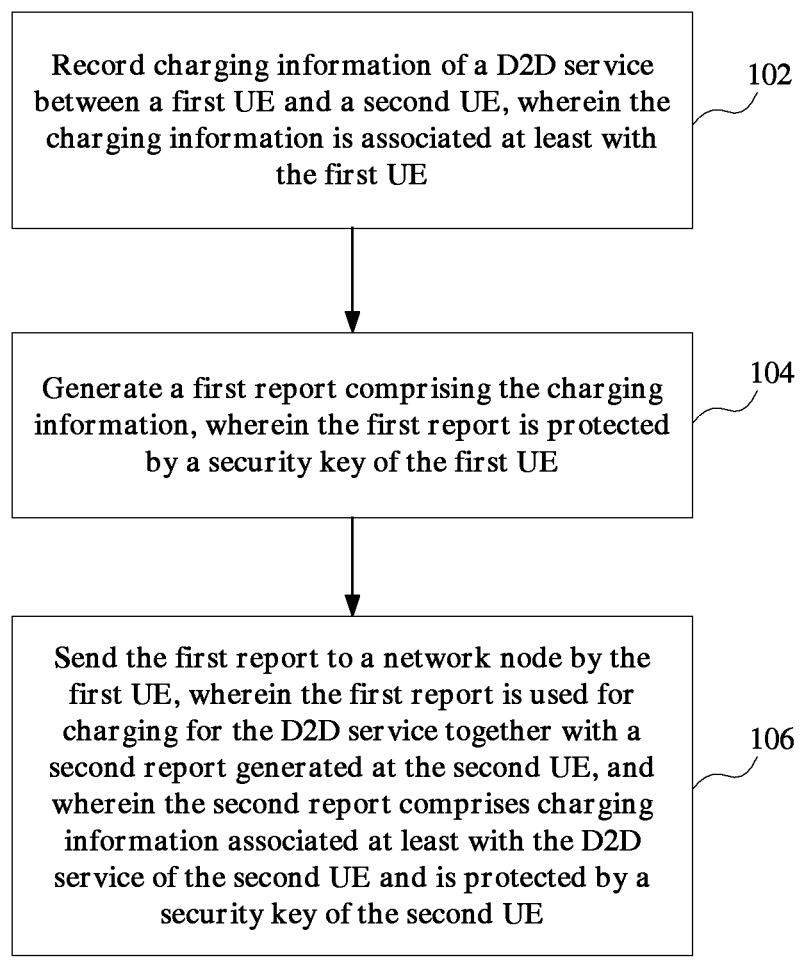
FIG. 1 is a flowchart illustrating a method of secure charging for a D2D service, which may be performed at a UE in accordance with embodiments of the present invention.

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Along with the development of radio communication networks such as Long Term Evolution (LTE) system, network-controlled D2D communications supported by LTE-Advanced (LTE-A) system have been treated as very attractive services. Examples of D2D communications comprise direct communications in a cluster of proximity devices, and autonomous D2D communications in a cellular network. D2D related topics have been widely discussed in 3GPP and also got great interests from different operators. In D2D investigations, lots of technical requirements and outlines have been confirmed and also fruitful contributions have been done to make the whole concept feasible both on physical layers and higher layers. As an example, with respect to a D2D Registration Server Function (DRSF) server introduced for registration, it may be needed to perform authentication and identification for D2D users. For example, a D2D user may register to a network with its D2D user identifier (ID) and temporary UE ID (such as System Architecture Evolution-Temporary Mobile Station Identifier (S-TMSI)), and also trigger for a D2D discovery. In practice, DRSF can be located in a Radio Access Network (RAN) entity (such as evolved Node B (eNB)), or in a core network entity (such as Mobility Management Entity (MME)), or in both with a hierarchical structure.

In regard to D2D communications formed in a macro network, one major concern from network operators (such as mobile operators or service providers) is how to benefit from D2D services from macro network point of view. On one hand, D2D communications could enable offloading operations to relieve a burden of the macro network; on the other hand, when D2D users are utilizing radio resources of the network operators for different services, which services supported by these radio resources might not even be provided by the network operators. In addition, it is also possible to enable UEs in idle mode to enjoy D2D services, but the network operators may need to guarantee that the charging for the related D2D users would proceed in a promised way, instead of using the network operator's resources for free for these D2D users. Furthermore, since D2D data traffics occur in communications between D2D UEs without going through the operator's network, the operator has no accurate information of the D2D communications. The operator can only require the D2D UEs to submit a billing record when the D2D communications are finished. Therefore, there are some potential threats. For example, the UE participating in the D2D communications may report a faked record to pay less; and if only one UE provides a charging report, it may forge the record to pay less and have its peer to pay more. The potential problems identified above need to be solved; otherwise the D2D charging would encounter big challenges and lead to a negative impact on the development of D2D communications.

According to exemplary embodiments, a novel secured charging solution is proposed for a D2D service. In the proposed solution, a pair of UEs involved in the D2D service may record D2D charging information and generate their respective charging reports. The charging information may contain, for example, identifiers of both UEs, duration of the D2D service, service type, bandwidth occupied, some Quality of Service (QoS) information about the D2D service, etc. The security of the D2D charging information can be ensured during the reporting procedure, which can promise the charging information would not be modified illegally. The secured charging reports may be sent to a core network via one of the pair of D2D UEs (which is connected to the core network side for example through a control connection), or by the two D2D UEs separately. As such, the core network may be able to verify and compare the charging reports comprising charging information from different UEs, and thus make the charging more fair and justified for both D2D UEs. More details of the proposed solution will be illustrated hereinafter by way of example with reference to the accompanying drawings.

FIG. 1 is a flowchart illustrating a method of secure charging for a D2D service, which may be performed at a UE in accordance with embodiments of the present invention. It is contemplated that the UE may be any type of mobile terminal, fixed terminal, or portable terminal comprising a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, comprising the accessories and peripherals of these devices, or any combination thereof. The solution according to exemplary embodiments may be applicable to a communications network such as LTE, LTE-A and any other networks suitable for supporting for network-controlled D2D communications. In such network, a UE may maintain a connection with another UE to engage in a D2D communication. The UE may have or not have a connection with a core network (such as via eNB, Access Point (AP), Base Station (BS), control center and the like). In general, the UE which has a connection with the core network may request the network side to provide a security key for the D2D service between this UE and another UE. The provided security key can be shared between these two UEs to establish the D2D service.

According to exemplary embodiments, charging information of a D2D service between a first UE and a second UE can be recorded at the first UE, as shown in block 102, and the charging information may be associated at least with the first UE. The first UE and the second UE engaged in the D2D service also may be called as D2D UEs or a D2D pair. For example, the charging information may indicate identifiers of the D2D UEs, service type, start time of the service, end time of the service, duration time of the service, quantity of the service, bandwidth occupied by the service, Quality of Service (QoS), or a combination thereof. In an exemplary embodiment, the charging information recorded at the first UE may be merely associated with this UE, for example, only indicate details of a bill with respect to the first UE without collecting charging information associated with the second UE in the D2D service. Alternatively, the charging information recorded at the first UE may be associated with the two UEs in the D2D service. In fact, even if a pair of D2D UEs only records their own charging information respectively, it is possible that the respective charging information and thus the charging reports of the pair of D2D UEs can be matched with each other. For instance, in case of the charging information indicating a total time for which the D2D service is supplied, the respective charging information recorded at different D2D UEs may be aligned with each other since the total time taken for the D2D service is the same for the D2D pair.

In block 104, a first report comprising the charging information recorded in block 102 can be generated at the first UE and protected by a security key of the first UE. For example, the security key of the first UE may be a security key shared between the first UE and a core network entity (such as MME), a security key shared between the first UE and an access network entity (such as eNB), or any other keys suitable for protecting security of the first report comprising the charging information. In block 106, the first report can be sent to a network node by the first UE, wherein the first report may be used for charging for the D2D service together with a second report generated at the second UE, and the second report may comprise charging information associated at least with the D2D service of the second UE and be protected by a security key of the second UE. In accordance with exemplary embodiments, the first report comprising the charging information may be sent to the network node when the D2D service is ongoing or terminated, and the D2D UE may report its charging information periodically or as triggered for example by event/time. According to exemplary embodiments, two schemes may be applicable for reporting the charging information. In scheme I, the charging information may be reported to a core network (for example, to a core network entity such as MME) via one D2D UE which is connected to the core network (for example, through a control connection). In scheme II, the charging information may be reported to the core network by the two D2D UEs separately. Thus, the network node to which the first report generated at the first UE is sent in block 106 of FIG. 1 may comprise a core network entity or the second UE in the D2D service. It depends on whether scheme I or scheme II is applied in reporting the charging information, and on whether the first UE or the second UE in the D2D service is in charge of reporting the charging information to the core network on behalf of the D2D pair when scheme I is applied.

In scheme I, in case that the first UE (such as UE2 shown in FIG. 4) is in charge of reporting charging information to the core network on behalf of the D2D pair, the first UE may be connected to the core network in which the core network entity is, and the second UE (such as UE1 shown in FIG. 4) in the D2D pair may be or not be connected to the core network. Accordingly, the first report in block 106 of FIG. 1 may be sent to the core network entity by the first UE together with the second report received at the first UE from the second UE. For example, the first UE (such as UE2 in FIG. 4) connected to the core network may be in Evolved Packet System (EPS) Radio Resource Control (RRC) connected mode, so as to send the charging report to the core network entity, as well as promise a network control for the D2D pair. Correspondingly, the second UE (such as UE1 in FIG. 4) in the D2D pair may be in EPS RRC connected mode or in EPS RRC idle mode. Considering the security of the second report received at the first UE from the second UE, the second report may be ciphered for the first UE which then sends its own report together with the received second report to the core network entity. In an exemplary embodiment, the security key used to protect the second report as described in block 106 may comprise a security key shared between the second UE and the core network entity. For example, the second report generated at the second UE (such as UE1 shown in FIG. 4) may be ciphered and integrity protected by the second UE's Non Access Stratum (NAS) security keys or keys derived from NAS layer keys which are shared between the second UE and MME. Particularly, the second report from the second UE may be in a container which is transparent to the first UE (such as UE2 shown in FIG. 4) when it sends the two reports to the core network entity, which means that the second report from the second UE cannot be interpreted by the first UE. Optionally, the security key used to protect the first UE's own report may comprise a security key shared between the first UE and the core network entity (such as MME), a security key shared between the first UE and the access network entity (such as eNB) or any other suitable security keys. Then the first UE may send the two reports comprising charging information of the D2D service to the core network entity (such as MME), for example, via an access network entity (such as eNB).

Correspondingly, in case that the first UE (such as UE1 shown in FIG. 4) just sends its own report to the second UE (such as UE2 shown in FIG. 4) in the D2D pair, while the second UE connected to the core network is in charge of reporting the charging information to the core network on behalf of the D2D pair, the first report generated at the first UE may be ciphered for the second UE which then forwards the received first report to the core network entity together with its own report. In this case, the security key used for the first UE to protect its report may comprise a security key (such as the first UE's NAS security keys or keys derived from NAS layer keys) shared between the first UE and the core network entity. It will be appreciated that the first report of the first UE also can be ciphered and integrity protected by other kinds of security keys, as long as the second UE cannot interpret the ciphered first report when it receives the first report from the first UE.

In scheme II, the first UE and the second UE (such as UE1 and UE2 shown in FIG. 5) in the D2D pair can send their respective reports to the core network entity separately. The respective reports may be protected by individual security keys, for example, NAS security keys or keys derived from NAS layer keys, or security keys shared between a UE and the corresponding eNB. In this case, the two reports may be associated with the same report identifier, according to an exemplary embodiment. Thus, the core network entity can associate the respective reports from different UEs through the same report identifier. For example, the report identifier may be generated based at least in part on respective identifiers (such as S-TMSI or any other suitable ID) of the first UE and the second UE in the D2D pair. Optionally, the two D2D UEs may be connected to the same or different access network entities (such as eNB/AP/BS). When the security key shared between a UE and the corresponding eNB is used to protect a charging report, the eNB may decipher and have integrity check on the report provided by the corresponding UE, and then forward it to the core network entity such as MME.

Figure 2:
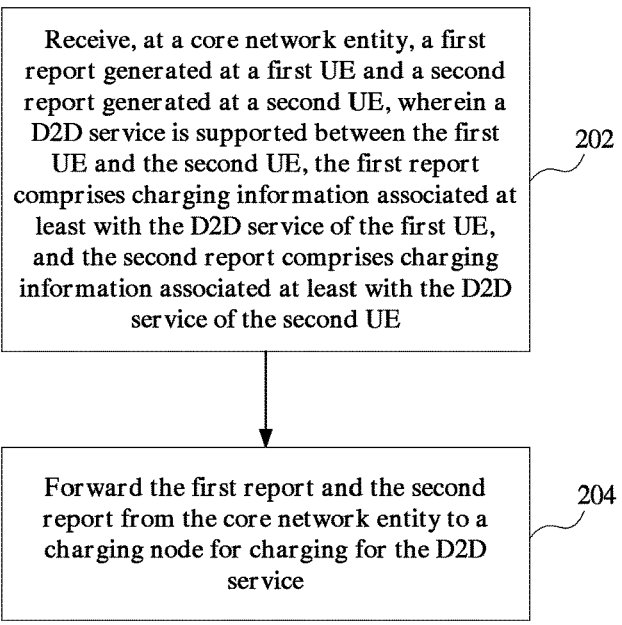
FIG. 2 is a flowchart illustrating a method of secure charging for a D2D service, which may be performed at a core network entity in accordance with embodiments of the present invention.

FIG. 2 is a flowchart illustrating a method of secure charging for a D2D service, which may be performed at a core network entity (such as MME) in accordance with embodiments of the present invention. Corresponding to steps and operations of the method described with respect to FIG. 1, a first report generated at a first UE and a second report generated at second UE can be received at the core network entity, as shown in block 202 of FIG. 2, wherein a D2D service may be supported between the first UE and the second UE, the first report may comprise charging information associated at least with the D2D service of the first UE, and the second report may comprise charging information associated at least with the D2D service of the second UE. According to exemplary embodiments, the two reports may be protected by individual security keys for respective UEs. In block 204, the first report and the second report can be forwarded from the core network entity to a charging node (such as Policy and Charging Enforcement Function (PCRF)) for charging for the D2D service. In an exemplary embodiment, the core network entity may forward the received charging reports of the D2D pair to the charging node while leaving the verification for the charging reports to the charging node. Alternatively, the core network entity may take charge of the verification on the charging reports from different UEs, for example, by comparing the charging reports generated respectively at the two D2D UEs. When the two reports are aligned with each other (for example, the charging information in the two reports is matched with each other), they can be forwarded to the charging node from the core network entity. If any mismatching happens to the charging reports from different UEs, an alarm may be raised accordingly. For example, the core network entity may trigger the alarm to operators. Optionally, the core network entity may not forward the two reports to the charging node in the event of mismatching.

In an exemplary embodiment where scheme I is applied in reporting charging information, the first report protected by a security key of the first UE (such as UE1 shown in FIG. 4) may be received, together with the second report protected by a security key of the second UE (such as UE2 shown in FIG. 4), from the second UE connected to a core network in which the core network entity is. Particularly, the core network entity may receive these two reports from the second UE (such as UE2 shown in FIG. 4) via an access network entity (such as eNB). In this case, the first UE sends the first report to the second UE in the D2D pair. For the sake of security, the first report received at the second UE from the first UE may be ciphered for the second UE. For example, the security key of the first UE may comprise a security key shared between the first UE (such as UE1 shown in FIG. 4) and the core network entity (such as MME). Optionally, the core network entity may perform an operation of decipherment and integrity check at least on the first report generated at the first UE. When the operation of decipherment and integrity check on the first report is performed successfully, the first report and the second report may be forwarded to the charging node from the core network entity.

In an exemplary embodiment where scheme II is applied in reporting charging information, the first report protected by a security key of the first UE (such as UE1 shown in FIG. 5) may be received from the first UE, and the second report protected by a security key of the second UE (such as UE2 shown in FIG. 5) may be received from the second UE. It is noted that the reports received at the core network entity may have been deciphered and checked by the associated access network entity (such as eNB) in case that the security keys shared between the UEs and the access network entity are used to protect the reports. In the exemplary embodiment for scheme II, the first report and the second report may be associated with the same report identifier. For example, the report identifier may be generated based at least in part on respective identifiers (such as S-TMSI) of the first UE and the second UE. As such, the core network entity (such as MME) can perform the verification on the charging reports, for example, comparing the two reports by associating them through the same report identifier. Alternatively, the report identifier may be used by the charging node to perform the verification on the charging reports, in case that the core network entity does not take charge of such verification. In an exemplary embodiment, the core network entity may perform respective operations of decipherment and integrity check on the received reports, especially when the security keys shared between the UEs and the core network entity are used for protecting the charging reports. When the operations of decipherment and integrity check on the first report and the second report are performed successfully, the two reports may be forwarded to the charging node from the core network entity.

Figure 3:
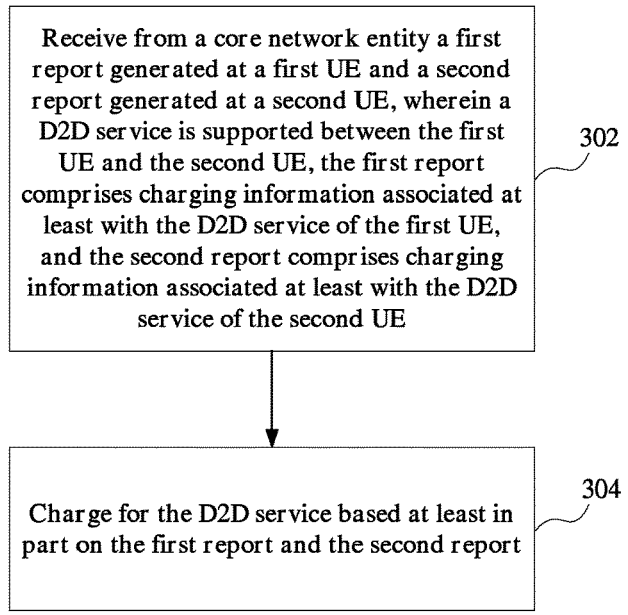
FIG. 3 is a flowchart illustrating a method of secure charging for a D2D service, which may be performed at a charging node in accordance with embodiments of the present invention.

FIG. 3 is a flowchart illustrating a method of secure charging for a D2D service, which may be performed at a charging node (such as PCRF) in accordance with embodiments of the present invention. Corresponding to steps and operations of the methods described with respect to FIG. 1-2, a first report generated at a first UE and a second report generated at second UE can be received at the charging node from a core network entity, as shown in block 302 of FIG. 3, wherein a D2D service may be supported between the first UE and the second UE, the first report may comprise charging information associated at least with the D2D service of the first UE, and the second report may comprise charging information associated at least with the D2D service of the second UE. In block 304, the charging node may charge for the D2D service based at least in part on the first report and the second report. For example, the charging node may verify or check the received reports for the D2D pair by comparing the charging information in the two reports, in case that the core network entity does not take charge of the verification on the charging reports. When the two reports are aligned with each other, the two UEs may be charged respectively for the D2D service. For example, normal or specified charging principles may be used by the charging node. If the two reports are mismatching, an alarm may be raised to operators. Optionally, the charging node could record the event of mismatching for further handling. In an exemplary embodiment where scheme II is applied in reporting charging information, the two reports may be associated with the same report identifier which can be used in comparing the respective reports from different UEs, as described with respect to the UEs in FIG. 1 and the core network entity in FIG. 2. Although operations and functionalities of the core network entity and the charging node are illustrated in connection with FIGS. 2-3 respectively, it would be realized that these operations and functionalities of the core network entity and the charging node also can be implemented in an integrated network entity, or by one or more other equivalent entities.

FIG. 4 exemplarily illustrates a procedure of secured charging reporting via one UE in accordance with an embodiment of the present invention. As described in connection with FIGS. 1-3, charging information of a D2D service can be reported to the CN with scheme I or scheme II. The procedure illustrated in FIG. 4 corresponds to scheme I, in which the charging information is reported by a D2D UE (such as UE2 shown in FIG. 4) connected to the network side. For example, UE1 in FIG. 4 may initiate the D2D communication with UE2, and UE2 may take care of key pairing by requesting the network side to provide a security key for the D2D service. The same security key can be shared between UE1 and UE2, and accordingly the D2D service can be established between UE1 and UE2. According to an exemplary embodiment, UE2 may be in charge of reporting the charging information to the network side on behalf of the D2D pair. For example, when the D2D service is finished, UE2 may be responsible for reporting the bill to the network side for both UE1 and UE2. For example, when the D2D service is about to be finished, UE1 can generate a charging report (which may be either regarding UE1 only, or regarding both UE1 and UE2) according to a specified D2D charging policy of the network operator, and send the charging report to UE2. This charging record may be ciphered and integrity protected, for example, by UE1's NAS security keys or keys derived from NAS keys and shared between UE1 and a MME. So this report would not be interpreted by UE2. If UE1 has no valid NAS keys, it may need to refresh the NAS keys. Similarly, UE2 can generate a charging report (which may be either regarding UE2 only, or regarding both UE1 and UE2) according to the specified D2D charging policy of the network operator. Optionally, this charging record also may be ciphered and integrity protected, for example, by UE2's NAS security keys or keys derived from NAS keys and shared between UE2 and the MME, or by keys shared between UE2 and the eNB shown in FIG. 4. Then, UE2 may send its own report (on behalf of the D2D pair) together UE1's report (which may be in a container transparent to UE2) to the MME in the CN shown in FIG. 4 via the eNB. According to an exemplary embodiment, the MME may decipher and have an integrity check of the UE1's provided charging report. If the decipherment and the integrity check are successful, the MME may forward both reports to a charging node (such as PCRF) in the CN. The charging node may compare the UE1's provided charging report with the UE2's provided charging report, to guarantee justified charging for the D2D pair. If the two reports are aligned with each other, normal charging principles may be used; otherwise, the charging node could record this event for further handling, raise an alarm to operators, and/or the like. Alternatively, the MME can also do the verification on the charging reports from different UEs by comparing the UE1's provided charging report with the UE2's provided charging report. Optionally, the MME may send the charging reports to the charging node (such as PCRF) for further handling only when the verification is successful. In this case, if any mismatching happens to the charging reports from different UEs, the MME would be the node which triggers the alarm to the operators. In the scheme illustrated in FIG. 4, UE1 could either be in idle mode (such as EPS RRC idle mode) or connected mode (such as EPS RRC connected mode), UE2 which is responsible for reporting the charging reports to the network side is required to be in connected mode (such as EPS RRC connected mode) for reporting charging information, as well as promising the network control for the D2D pair.

FIG. 5 exemplarily illustrates a procedure of secured charging reporting via a pair of D2D UEs separately in accordance with an embodiment of the present invention. The procedure illustrated in FIG. 5 corresponds to scheme II, in which the charging information is reported by two D2D UEs (such as UE1 and UE2 shown in FIG. 5) to the network side separately. Similar to scheme I, a D2D service may be established between UE1 and UE2. However, in scheme II, both UEs from the D2D pair can record the charging information regarding itself or the D2D pair, and report the bill to the network side respectively for example when the D2D service is finished. According to an exemplary embodiment, the charging reports from the D2D pair may be ciphered and integrity protected with individual security keys (for example, NAS layer security keys or keys derived from NAS layer keys, or keys shared between the UE and the eNB). When the MME receives the charging reports for example via the eNB, similar to the operations performed in scheme I of FIG. 4, the MME can decipher and have an integrity check of the provided charging reports from UE1 and UE2 in case that NAS layer keys are used, and then forward the both reports to the charging node (such as PCRF) in the CN shown in FIG. 5. The charging node can make a comparison of the received charging reports. If the two reports are aligned with each other, normal charging principles may be used; otherwise, the charging node in the CN could record this event for further handling, raise an alarm to operators, and/or the like. Alternatively, the MME can also take charge of verification and/or comparison for the charging reports, and if there are any problems, the MME may raise an alarm accordingly. Optionally, the MME can forward the charging reports to the PCRF only when a check related to the verification and/or the comparison on the charging reports in the MME passes successfully. In scheme II, the charging reports provided by the D2D pair may have the same ID formed from respective identifiers (such as S-TMSI) of UE1 and UE2. So the MME or the PCRF can associate these two reports for the verification and/or the comparison. In particular, UE1 and UE2 in this scheme can connect to different eNBs. Thus, the charging reports of the D2D pair may be sent to the CN through different paths.

The various blocks shown in FIG. 1-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown. Many advantages can be achieved by using the solution provided by the present invention. With the proposed solution, the reliability of a charging report can be enhanced for operators so that the operators may be able to verify and compare the charging information from different UEs as one D2D pair for the D2D service, which can disable the illegal modification for the charging report and hence make the charging more fair and justified for both D2D UEs.

Figure 6:
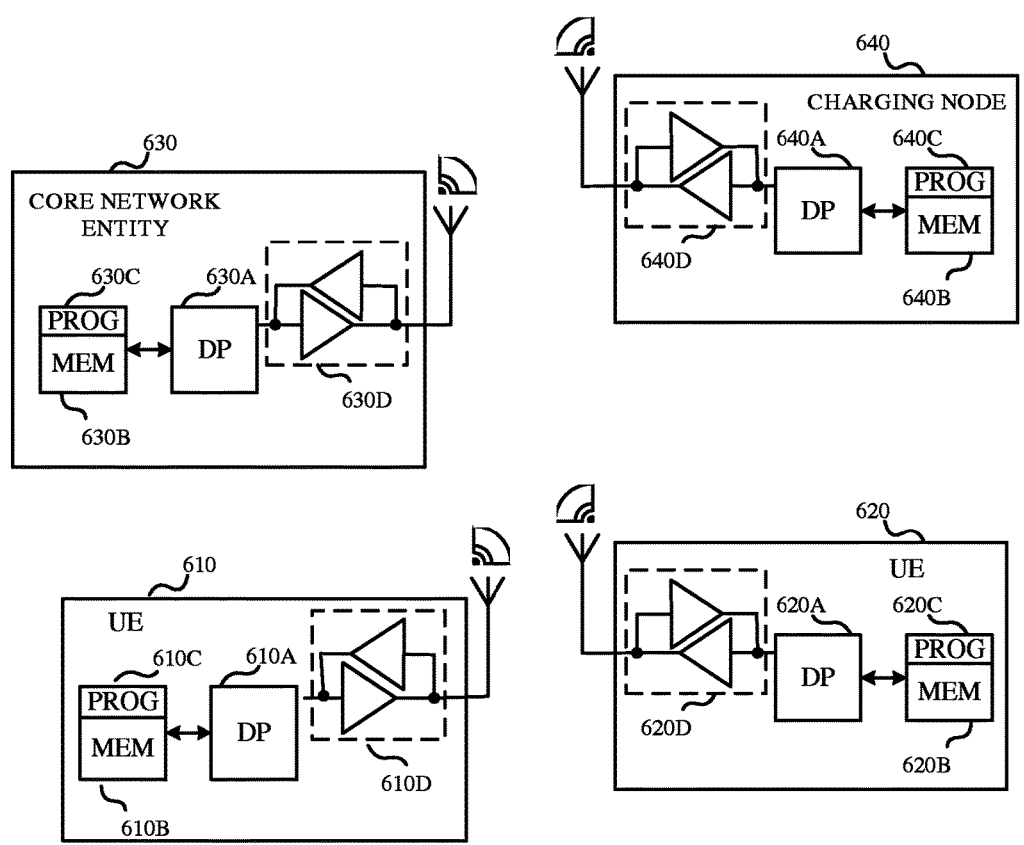
FIG. 6 is a simplified block diagram of various apparatuses which are suitable for use in practicing exemplary embodiments of the present invention.

FIG. 6 is a simplified block diagram of various apparatuses which are suitable for use in practicing exemplary embodiments of the present invention. In FIG. 6, a UE 610/620 (such as mobile phone, wireless terminal, portable device, PDA, multimedia tablet and the like) may be adapted for communicating with one or more network nodes such as second UE, an access network entity (such as an eNB, an AP, a BS, a control center and the like), a core network entity 630, and a charging node 640. The core network node 630 (such as a MME and the like) and the charging node 640 (such as a PCRF and the like) may be adapted to communicate with each other for transferring charging information. In an exemplary embodiment, the UE 610/620 may comprise at least one processor (such as a data processor (DP) 610A/620A shown in FIG. 6), and at least one memory (such as a memory (MEM) 610B/620B shown in FIG. 6) comprising computer program code (such as a program (PROG) 610C/620C shown in FIG. 6). The at least one memory and the computer program code may be configured to, with the at least one processor, cause the UE 610/620 to perform operations and/or functions described in combination with FIGS. 1-5. In an exemplary embodiment, the UE 610/620 may optionally comprise a suitable transceiver 610D/620D for communicating with an apparatus such as second UE, an access network node, a core network node and so on. In an exemplary embodiment, the core network node 630 may comprise at least one processor (such as a data processor (DP) 630A shown in FIG. 6), and at least one memory (such as a memory (MEM) 630B shown in FIG. 6) comprising computer program code (such as a program (PROG) 630C shown in FIG. 6). The at least one memory and the computer program code may be configured to, with the at least one processor, cause the core network node 630 to perform operations and/or functions described in combination with FIGS. 1-5. In an exemplary embodiment, the core network node 630 may optionally comprise a suitable transceiver 630D for communicating with an apparatus such as the charging node 640, the UE 610/620, an access network node or other network entity (not shown in FIG. 6). In an exemplary embodiment, the charging node 640 may comprise at least one processor (such as a data processor (DP) 640A shown in FIG. 6), and at least one memory (such as a memory (MEM) 640B shown in FIG. 6) comprising computer program code (such as a program (PROG) 640C shown in FIG. 6). The at least one memory and the computer program code may be configured to, with the at least one processor, cause the charging node 640 to perform operations and/or functions described in combination with FIGS. 1-5. In an exemplary embodiment, the charging node 640 may optionally comprise a suitable transceiver 640D for communicating with an apparatus such as the core network node 630, a database or other network entity (not shown in FIG. 6). For example, at least one of the transceivers 610D, 620D, 630D, 640D may be an integrated component for transmitting and/or receiving signals and messages. Alternatively, at least one of the transceivers 610D, 620D, 630D, 640D may comprise separate components to support transmitting and receiving signals/messages, respectively. The respective DPs 610A, 620A, 630A and 640A may be used for processing these signals and messages.

Alternatively or additionally, the UE 610/620, the core network node 630 and the charging node 640 may comprise various means and/or components for implementing functions of the foregoing steps and methods in FIG. 1 and FIGS. 4-5. For example, a first UE (such as the UE 610) may comprise: recording means for recording charging information of a D2D service between the first UE and a second UE (such as the UE 620), wherein the charging information is associated at least with the first UE; generating means for generating a first report comprising the charging information, wherein the first report is protected by a security key of the first UE; and sending means for sending the first report to a network node (such as the core network entity 630 or the UE 620) by the first UE, wherein the first report is used for charging for the D2D service together with a second report generated at the second UE, and wherein the second report comprises charging information associated at least with the D2D service of the second UE and is protected by a security key of the second UE.

In an exemplary embodiment, the core network node 630 may comprise: receiving means for receiving a first report generated at a first UE (such as the UE 610) and a second report generated at a second UE (such as the UE 620), wherein a D2D service is supported between the first UE and the second UE, the first report comprises charging information associated at least with the D2D service of the first UE, and the second report comprises charging information associated at least with the D2D service of the second UE; and forwarding means for forwarding the first report and the second report from the core network node to a charging node (such as the charging node 640) for charging for the D2D service.

In an exemplary embodiment, the charging node 640 may comprise: receiving means for receiving from a core network entity (such as the core network entity 630) a first report generated at a first UE (such as the UE 610) and a second report generated at a second UE (such as the UE 620), wherein a D2D service is supported between the first UE and the second UE, the first report comprises charging information associated at least with the D2D service of the first UE, and the second report comprises charging information associated at least with the D2D service of the second UE; and charging means for charging for the D2D service based at least in part on the first report and the second report.

At least one of the PROGs 610C, 620C, 630C, 640C is assumed to comprise program instructions that, when executed by the associated DP, enable an apparatus to operate in accordance with the exemplary embodiments, as discussed above. That is, the exemplary embodiments of the present invention may be implemented at least in part by computer software executable by the DP 610A of the UE 610, by the DP 620A of the UE 620, by the DP 630A of the core network node 630 and by the DP 640A of the charging node 640, or by hardware, or by a combination of software and hardware.

The MEMs 610B, 620B, 630B and 640B may be of any type suitable to the local technical environment and may be implemented using any suitable data storage technology, such as semiconductor based memory devices, flash memory, magnetic memory devices and systems, optical memory devices and systems, fixed memory and removable memory. The DPs 610A, 620A, 630A and 640A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skills in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. An apparatus, comprising:
   at least one processor; and
   at least one memory comprising computer program code,
   the at least one memory and the computer program code configured to, with the at least one processor, cause the apparatus at least to:
      record first charging information of a device-to-device service between the apparatus and another apparatus;
      generate, upon completion of the device-to-device service, a first report comprising the first charging information associated with the apparatus, wherein the first report is protected by a security key of the apparatus;
      receive, from the other apparatus and upon completion of the device-to-device service, a second report comprising second charging information associated with the other apparatus, wherein the second report is protected by a security key of the other apparatus and ciphered for the apparatus; and
      send the first report and the second report to a core network entity, the core network entity configured to decipher and integrity check the second report.

2. The apparatus according to claim 1, wherein the first report and the second report are associated with a same report identifier.

3. The apparatus according to claim 2, wherein the report identifier is generated based at least in part on respective identifiers of the apparatus and the other apparatus.

4. The apparatus according to claim 1, wherein the apparatus is connected to a core network in which the core network entity is a part.

5. The apparatus according to claim 4, wherein the security key of the other apparatus comprises a security key shared between the other apparatus and the core network entity.

6. An apparatus, comprising:
   at least one processor; and
   at least one memory comprising computer program code,
   the at least one memory and the computer program code configured to, with the at least one processor, cause the apparatus at least to:
      receive, from a first user equipment and upon completion of a device-to-device service between the first user equipment and a second user equipment, a first report generated at the first user equipment and a second report generated at the second user equipment, the first report comprising first charging information associated at least with the first user equipment for the device-to-device service and protected by a security key of the first user equipment, the second report comprising second charging information associated at least with the second user equipment for the device-to-device service, and wherein the second report is protected by a security key of the second user equipment and ciphered for the first user equipment;
      decipher the second report; and
      forward the first report and the deciphered second report to a charging node for charging each of the first user equipment and the second user equipment for the device-to-device service based on the respective reports.

7. The apparatus according to claim 6, wherein the first report and the second report are associated with a same report identifier.

8. The apparatus according to claim 7, wherein the report identifier is generated based at least in part on respective identifiers of the first user equipment and the second user equipment.

9. The apparatus according to claim 6, wherein the first report and the second report are forwarded to the charging node from the apparatus, when operations of decipherment and integrity check on at least one of the first report and the second report are performed at the apparatus successfully.

* * * * *